United States Patent [19]
Bown et al.

[11] Patent Number: 6,087,404
[45] Date of Patent: Jul. 11, 2000

[54] PREPARATION OF SYSTEMS OF GROUND PARTICULATE MATERIAL

[75] Inventors: Richard Bown, St Austell; David Robert Skuse, Truro, both of United Kingdom

[73] Assignee: Imerys Minerals Limited, Cornwall, United Kingdom

[21] Appl. No.: 09/043,052

[22] PCT Filed: Sep. 12, 1996

[86] PCT No.: PCT/GB96/02268

§ 371 Date: Jun. 1, 1998

§ 102(e) Date: Jun. 1, 1998

[87] PCT Pub. No.: WO97/10308

PCT Pub. Date: Mar. 20, 1997

[30] Foreign Application Priority Data

Sep. 12, 1995 [GB] United Kingdom .................... 9518597
Sep. 12, 1995 [GB] United Kingdom .................... 9518602

[51] Int. Cl.[7] ............................ B01J 13/00; B02C 19/12; C08K 3/26; C09C 3/04
[52] U.S. Cl. ............................. 516/88; 106/465; 241/16; 516/79; 516/928; 524/425
[58] Field of Search ............................. 516/79, 88, 928; 106/465; 241/16; 524/425

[56] References Cited

U.S. PATENT DOCUMENTS

| | | |
|---|---|---|
| 3,322,683 | 5/1967 | Lester ........................................ 516/88 |
| 4,278,208 | 7/1981 | Falcon-Steward ........................ 241/16 |
| 4,293,097 | 10/1981 | Lewis et al. .............................. 241/16 |
| 4,840,985 | 6/1989 | Gonnet et al. ....................... 106/465 X |
| 4,849,128 | 7/1989 | Timmons et al. ..................... 516/88 X |
| 5,076,846 | 12/1991 | Buri et al. ............................. 516/79 X |
| 5,533,678 | 7/1996 | Strauch et al. ............................ 241/16 |
| 6,003,795 | 12/1999 | Bown et al. ............................... 241/16 |

*Primary Examiner*—Richard D. Lovering
*Attorney, Agent, or Firm*—Finnegan, Henderson, Farabow, Garrett & Dunner L.L.P.

[57] ABSTRACT

There is disclosed a process for preparing a concentrated aqueous suspension of a finely ground particular material, which process comprises (a) preparing an aqueous suspension comprising at least 20% by weight of the particulate material comprising calcium carbonate in coarse particular form; (b) grinding the suspension formed in step (a) in the presence of a polycarboxylate dispersing agent for the particular material in a grinding process where the pH is not less than 10 to produce an aqueous suspension wherein at least 90% by weight of the particles or the particulate material have an e.s.d. less than 2 $\mu$m and 60% by weight have an e.s.d. less than 1 $\mu$m; (c) adding an additive comprising an anionic polycarboxylate dispersing agent to the suspension of ground material formed in step (b). The process is characterized in that the aqueous suspension formed in step (c) has a pH which lies within the inclusive range 8.5 to 9.8 and in that, following addition of the anionic polycarboxylate dispersing agent in step (c), the suspension is not ground further. Using the method described, suspension can be prepared which are rheologically stable with time, and which contain a relatively high proportion by weight of a finely divided pigment.

19 Claims, 1 Drawing Sheet

PREPARATION OF SYSTEMS OF GROUND PARTICULATE MATERIAL

This application is a 371 of PCT/GB96/02268 filed Sep. 12, 1996.

This invention concerns a method for preparing a rheologically stable, concentrated aqueous suspension of an inorganic particulate mineral such as a finely divided alkaline earth metal pigment.

It is often advantageous to produce and distribute alkaline earth metal pigment or filler materials, especially to the paper and water based paints industries, in the form of a concentrated suspension in water. A user receiving an alkaline earth metal pigment material in this form is able to avoid the high energy and capital costs which would be involved in the mixing of a dry material with water to form a suspension on his own premises, and, if the alkaline earth metal pigment is produced by a wet route, the producer is able to avoid the costs of complete drying of the material. A concentrated aqueous suspension is also easy to handle and convey, and presents no dust problem.

The rheological properties of an aqueous suspension of an alkaline earth metal pigment depend upon a number of factors including the concentration of solid material in the suspension, the particle size distribution of the solid material, as indicated, for example, by the percentage by weight of the particles having an equivalent spherical diameter (e.s.d.) smaller than 2 $\mu$m, and the type and amount of dispersing agent which is used. Generally, a suspension becomes more viscous, or less fluid, as the solids concentration is increased, or as the percentage by weight of the particles having an e.s.d. smaller than 2 $\mu$m is increased. Also there is an increasing tendency for the suspension to become more viscous with time on storage. Assuming that an effective dispersing agent for the alkaline earth metal pigment is available, it is generally found that there is an optimum amount of the dispersing agent which must be added to the suspension to give maximum fluidity and maximum rheological stability, other factors being kept the same.

EP-A-0216002 describes a process of beneficiating calcite including subjecting a concentrated slurry of the calcite particles to multistage grinding by passing the slurry in series from an upstream grinding stage through one or more downstream grinding stages wherein each downstream grinding stage is charged with a grinding medium having a particle size finer than the grinding medium of the preceding upstream grinding stage. Grinding media comprising particles of alumina, alumina/silica, or zirconia/silica are disclosed. A dispersing agent, eg. an aqueous solution of a water-soluble polyacrylate, such as sodium polyacrylate, is preferably added to the slurry prior to grinding.

U.S. Pat. No. 4,325,514 discloses a grinding method in which a mineral is wet ground in a first grinding chamber in the absence of a grinding medium. The ground mineral may be further ground in a second grinding chamber in the presence of a grinding medium. In the first grinding chamber a dispersing agent is required. The use of a dispersing agent in the second grinding chamber is optional.

EP-A-0595723 discloses a grinding process in which a compact mineral (such as calcium carbonate), a lamellar mineral (such as kaolin) and a plastic pigment are co-ground in the presence of a grinding agent in pre-grinding and final grinding steps, both of which are conducted in the same grinding vessel. The final grinding may be conducted in the presence of a colloidal protective agent.

We have found that the procedures described in the prior art for treating inorganic particulate material such as calcium carbonate by grinding are not optimum and that grinding may be improved by operation in accordance with the present invention.

BRIEF DESCRIPTION OF THE DRAWING

The accompanying drawing is a diagrammatic flow chart illustrating the process embodying the present invention.

The present invention provides a process for forming a concentrated aqueous suspension of a particulate inorganic material such as an alkaline earth metal pigment which, when compared with suspensions which are currently available in commerce, will have a higher solids concentration for a given fluidity, percentage by weight of particles having an e.s.d. smaller than 2 $\mu$m, and dispersing agent dose, or a higher percentage by weight of particles having an e.s.d. smaller than 2 $\mu$m for a given fluidity, solids concentration and dispersing agent dose, or a higher fluidity for a given percentage by weight of particles having an e.s.d. smaller than 2 $\mu$m, solids concentration and dispersing agent dose, or a smaller dispersing agent dose for a given percentage by weight of particles having an e.s.d. smaller than 2 $\mu$m, solids concentration and fluidity.

Figure 1:
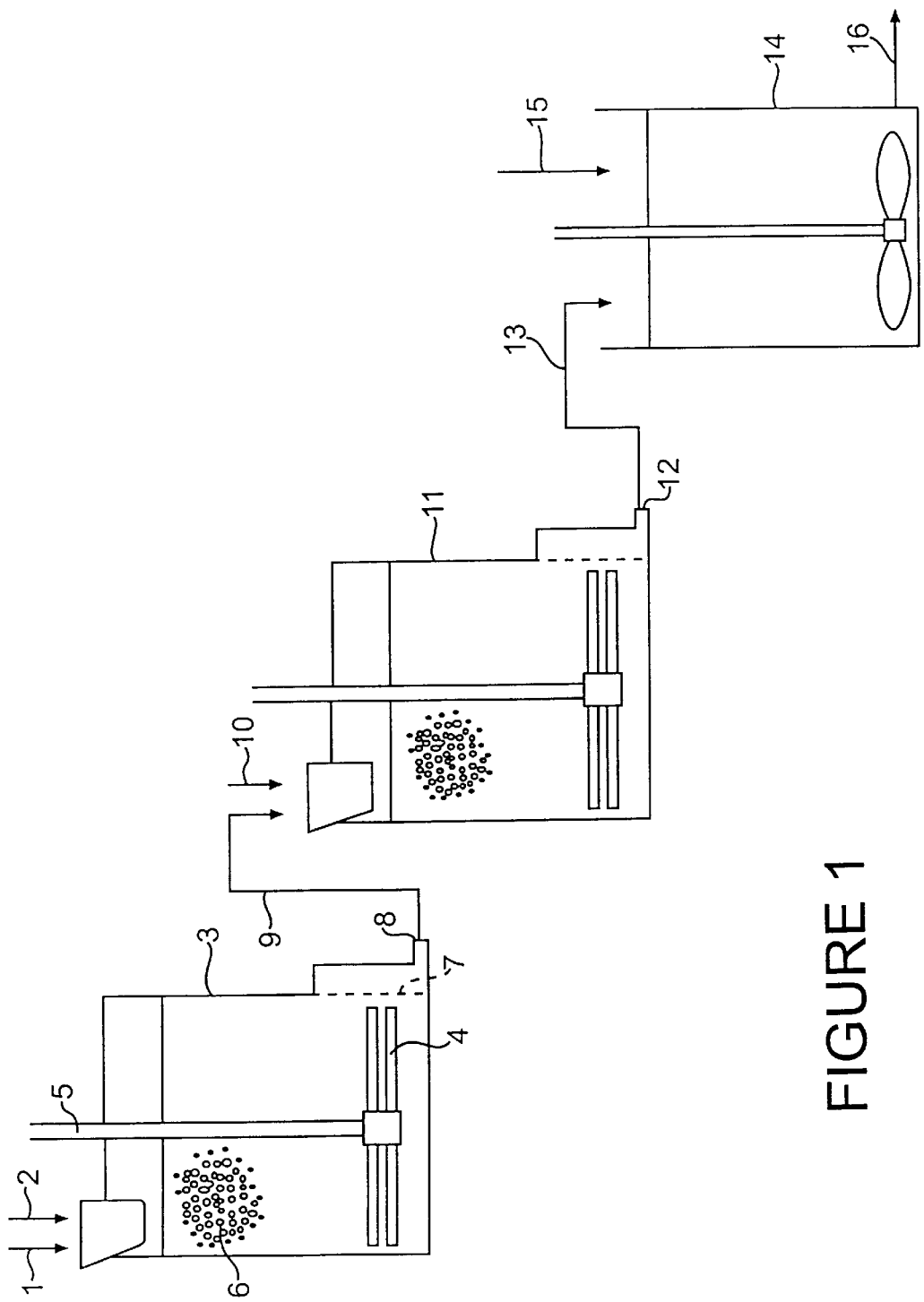

According to a first aspect of the present invention, there is provided a process for preparing a concentrated aqueous suspension of a finely ground particulate material, which process comprises:

(a) preparing an aqueous suspension comprising at least 20% by weight of the particulate material in coarse particulate form;

(b) grinding the suspension formed in step (a) in the presence of a polycarboxylate dispersing agent for the particulate material;

(c) adding further polycarboxylate dispersing agent to the suspension of ground material formed in step (b);

characterised in that the aqueous suspension formed in step (c) has a pH which lies within the inclusive range 8.5 to 9.8; and in that, following addition of the polycarboxylate dispersing agent in step (c), the suspension is not ground further. If appropriate, the suspension of ground material is dewatered, if necessary, to a concentration of at least 65% by weight of the dry material.

The basis of the present invention is the grinding of an inorganic particulate material such as an alkaline earth metal pigment, in the presence of a polycarboxylate dispersing agent, and after the completion of grinding, the addition of further polycarboxylate dispersing agent which may or may not be the same as the dispersing agent used in step (a), the pH of the suspension being controlled in step (c) to lie within the inclusive range 8.5 to 9.8, preferably 8.5 to 9.5, most preferably 8.8 to 9.2. Ways in which the pH may be controlled to lie in the required range are described hereinafter.

Grinding step (b) may be a single grinding stage or may comprise a series of grinding stages (multi-stage grinding) as described in EP-P-A-0216002 and U.S. Pat. No. 4,322,514. A dispersant addition site may be associated with the or each grinding stage to introduce dispersant into the suspension during the grinding operation. The or each dispersing agent addition site may comprise a grinding vessel or mill at which grinding is also to be carried out in a grinding stage but we prefer to add the dispersing agent to the suspension before the suspension reaches the grinding stage, eg. at a site associated with a pump for pumping the suspension to the grinding stage which is located downstream of it.

In accordance with the invention, an additional dispersant addition site may be situated downstream of the last grinding stage to introduce further dispersant, and if necessary other additive(s), to the ground suspension.

The stage at which the suspension of ground particulate material is dewatered (if necessary) to a concentration of at least 65% by weight of the dry material as not critical. Thus, the post-grinding addition of polycarboxylate dispersing agent may be made in step (c) before or after dewatering.

The inorganic particulate material may comprise an insoluble salt of an alkaline earth metal, eg. of calcium. The material after treatment by the method according co the present invention may be intended for use as a pigment, in particular a paper coating pigment which may be formulated into a paper coating composition in a manner known per se.

The concentration of the particulate inorganic material in the suspension in step (a) is preferably at least 40% by weight, more preferably in the range of from 60 to 80% by weight.

The method according to the present invention may be carried out as a continuous process or as a batch process. Preferably, the process is a multi-stage grinding continuous process in which the aqueous suspension to be treated is continuously passed between grinding stages which are carried out in separate, interconnected grinding vessels. Such a continuous process is known as cascade grinding, progressively finer solid material being ground being allowed to pass in the suspension down the grinding chain. There may be provided between the grinding stages and optionally after the last grinding stage means for separating the solid material by particle size, eg. a sieve or screen, so that only a finer separated fraction is passed on.

Each of the grinding stages may be conducted in one or more grinding vessels. For example the first stage may be conducted in a single vessel and one or more of the subsequent stages may be carried out in a plurality of, eg. two or three, vessels connected in series or in parallel.

The grinding carried out at each grinding stage may comprise either (a) medium attrition grinding using a known grinding medium such as granules of alumina or silica or a mixed oxide system; or (b) autogenous grinding in which the particles grind each other without the assistance of an additional grinding medium. We prefer that at least the last stage in the process comprises medium attrition grinding.

In each of the grinding stages wherein the suspension is medium attrition ground, it is preferably ground with a particulate grinding medium which comprises particles not larger than 2 mm and not smaller than 0.1 mm. More preferably the particles of the grinding medium are not larger than 1 mm and not smaller than 0.25 mm. After the or each medium attrition grinding stage, the particulate material being ground may be separated from the grinding medium.

The addition of the dispersing agent at each addition site may be carried out as a single dose or, especially where the process is a continuous process, as a plurality of separate doses or as a continuous addition.

In the method according to the present invention the grinding stages may be preceded by one or more other treatment steps which may include at least one preliminary comminution step. For example, the inorganic particles entering the first grinding stage may have a particle size distribution such that at least about 30% (and preferably no greater than 75%) have an esd less than 10 $\mu$m and not less than 20% have an esd less than 2 $\mu$m. These particles may be obtained by treatment of mineral chips, eg. of chalk or marble, up to 100 mm in diameter, normally of diameter in the range 10 mm to 30 mm. The treatment of mineral chips may include as a preliminary comminution step treatment in a mill, eg. a hammer mill, or wet autogenous grinding as for example described in U.S. Pat. No. 4,325,514 or by preliminary wet grinding.

In a preliminary wet grinding step, a dispersing agent may or may not be used, depending upon the solids concentration of the suspension. If the solids concentration is above about 50% by weight a dispersing agent must normally be used. The dispersing agent in such a preliminary step is preferably a polycarboxylate.

For example, the preliminary grinding step may be any one of the following:

high solids concentration (above 50% by weight, and preferably in the range from 65% to 80% by weight) wet autogenous grinding with a dispersing agent;

low solids concentration (below 50% by weight) wet grinding without a dispersing agent, but with or without a grinding medium of chemical composition different from that of the particulate material; in this case a dewatering step would be needed as part of the method according to the present invention preferably before the first dispersant addition is made; or dry grinding with no dispersing agent followed by mixing with water containing a dispersing agent or to which a dispersing agent is subsequently added to form a high solids concentration suspension.

We prefer that the method according to the present invention is carried out as an at least three grinding stage grinding process in which the last three stages are medium attrition grinding stages each carried out after a separate dispersing agent addition has been made.

These three stages may be preceded by one of the preliminary steps, eg. Preliminary comminution steps, described above. If a preliminary comminution step is included then we prefer that it is a wet autogenous grinding step. The overall process will then comprise (at least) a four grinding stage process embodying the present invention.

In such three or four stage processes, the particle size distribution of the particulate material to be ground in the aqueous suspension when delivered as a feed suspension in the first of the last three grinding stages is typically such that at least 20% by weight of the particles have an esd smaller than 2 $\mu$m and at least about 30% (preferably no greater than about 75%) have an esd smaller than 10 $\mu$m, as measured by means of a SEDIGRAPH 5000 instrument, manufactured by Micrometrics Corporation. The feed from that grinding stage to the next grinding stage preferably has a particle size distribution such that from 50% to 80% by weight of the particles have an esd, smaller than 2 $\mu$m and at least 40% have an esd less than 1 $\mu$m. Preferably, the feed to the next (last) grinding stage has a particle size distribution such that not less than 90% by weight have an esd less than 2 $\mu$m and at least 60% have an esd of less than 1 $\mu$m.

The sole or last grinding stage in the method according to the present invention may be followed by one or more further treatment steps additional to the post-grinding step of adding dispersant as herein described. For example, the aqueous suspension of the ground particulate material may be treated by froth flotation as described in GB 2204574 to separate a fine fraction product. The fine fraction product may have particles wherein at least 90% have an esd less than 2 $\mu$m and at least 60%, preferably at least 75%, have an esd less than 1 $\mu$m.

In the preferred three or four grinding stage process embodying the invention described above we prefer that the feed suspension to the first of the last three grinding stages comprises at least 40% by weight, preferably at least 50% by weight and most preferably at least 60% by weight (based on its dry weight) of the particulate inorganic solid material. In practice the aqueous suspension at that stage is unlikely to comprise more than 80% by weight of the particulate material.

The sole or last stage or grinding is preferably continued until the particle size distribution of the ground particulate material is such that at least 60% by weight of the particles have an equivalent spherical diameter smaller than 1 μm.

The particulate material treated by the method according to the present invention may comprise one or more or a calcium carbonate, a calcium sulphate, a barium sulphate or a magnesium silicate all of a natural or synthetic, eg. precipitated, origin. The preferred material is a natural calcium carbonate obtained from a mineral ore source such as chalk or marble. The starting ore may contain minor amounts (eg. up to 10% by weight) of other constituents, eg. feldspar and quartz.

Steps (a) and (b) may be combined so that the aqueous suspension is formed in situ at the single grinding chamber or at the first grinding stage if a multi-stage grinding process.

In step (a), the polycarboxylate dispersing agent is preferably substantially completely neutralised polycarboxylate. In such circumstances, the pH of the suspension during grinding will remain at or near 10.0.

The polycarboxylate dispersing agent added at the various addition sites in the method according to the present invention, which may be the same or different materials (as discussed further hereinafter), preferably comprises a homopolymer or copolymer which contains one or more monomer units comprising a vinyl or olefinic group which is substituted with at least one carboxylic acid group, or a water soluble salt thereof. Examples of suitable monomers are acrylic acid, methacrylic acid, itaconic acid, crotonic acid, fumaric acid, maleic acid, maleic anhydride, isocrotonic acid, aconitic acid, mesaconic acid, sinapinic acid, undecylenic acid, angelic acid and hydroxacrylic acid.

The amount of the dispersing agent added at each addition site in the method according to the present invention may be that represented by from 10 to 100 moles of carboxylate per dry tonne of particulate material.

During grinding, it is not essential that the treated suspension remains (or even starts) in a fully dispersed condition; nevertheless, during grinding, the suspension should be sufficiently fluid for grinding to take place with a reasonable input of energy into the grinder. In this respect, the total amount of energy dissipated in the suspension during the grinding stages should not normally be greater than 500 kW hours per tonne of dry pigment. It is normally required that the final suspension will be fully dispersed, and will not require further additions of a dispersing agent to render it fluid.

The weight average molecular weight of the polycarboxylate dispersing agent(s) should be not greater than 20,000, and preferably in the range from 700 to 10,000, as measured by the method of gel permeation chromatography using a low angle laser light scattering detector.

More preferably, the polycarboxylate dispersing agent used in each addition is a homopolymer or copolymer consisting of repeating units of the general formula: or a water soluble salt thereof, where $R_1$ is —H, —Alk, —COOH or —COOAlk

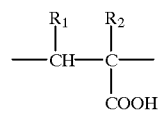

and $R_2$ is —H, —CH$_2$, COOH or —Alk
where Alk represents an alkyl group having from 1 to 3 carbon atoms.

A copolymer may also comprise up to 70% of repeating units of the general formula:

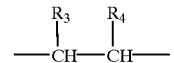

where $R_3$ is —H, —C$_6$H$_5$ or —Alk
and $R_4$ is —Cl, —CN, —COOAlk or —OCOAlk
where Alk represents an alkyl group having from 1 to 3 carbon atoms.

Especially preferred are water soluble salts of homopolymers of acrylic acid, methacrylic acid, maleic acid or fumaric acid, water soluble salts of copolymers or two or more of these monomers, and water soluble salts of copolymers of maleic acid or fumaric acid with styrene or vinyl acetate.

The dispersing agent may be added in the form of an acid or in the form of a salt having as a neutralising cation any one or more of the neutralising cations known in the dispersant art, such as an alkali metal cation, ammonium cation or an alkyl ammonium cation wherein the alkyl group has not more than 7 carbon atoms.

As described above, it is preferred that the method according to the present invention is carried out in at least three grinding stages each of which is associated with a dispersing agent addition site for adding a dispersing agent to the aqueous suspension. It is preferred that each separate addition of dispersing agent constitutes no more than 50% of the total amount of dispersing agent added during grinding. Normally, the number of dispersing agent addition sites is not greater than 10. Preferably, where there are D addition sites, each addition should constitute no greater than (2/D× 100) % of the total addition during the process. More preferably, an equal amount of dispersing agent is added at each addition site.

As described hereinbefore, the pH of the suspension after the completion of grinding should be controlled to lie in the inclusive range 8.5 to 9.8, desirably a pH in the inclusive range 8.5 to 9.5, especially 8.8 to 9.2.

In the method of the present invention the pH may be controlled in the required range in one of various ways which will be evident to those skilled in the treatment of inorganic mineral suspensions. Thus, in a first example of method to ensure that the pH after completion of grinding is controlled to lie in the desired range, a dispersing agent which is a water soluble acid may be added to the suspension to be treated followed by separate addition of an alkali such as sodium hydroxide. The amount of alkali added where added at more than one stage, may be reduced from stage-to-stage whereby the pH of the aqueous phase remains in the required range as the number of available cations on the surface of the particle surfaces to be treated increases as the particle size becomes smaller.

In a second example, a salt of a polycarboxylate dispersing agent, eg. sodium polyacrylate, is added after completion of grinding and the aqueous medium is diluted with water to reduce its pH and is then preferably reconcentrated by a known dewatering step, eg. filtration. Dilution and reconcentration in this way are described in the present applicant's PCT/GB95/00563 (WO 95/25146).

In a third example, different dispersing agents may be added at different addition stages. Thus, during grinding, a fully neutralised polycarboxylate salt may be added as dispersing agent whereas, after the completion of grinding, an acid form of the dispersing agent may be added. Preferably, the basic polymer or copolymer of the different dispersing agents is the same in each case.

In a fourth example, a combination of different dispersing agents may be added after the completion of grinding. The different agents may comprise a fully neutralised polycarboxylate salt and an acid form of polycarboxylate which may be added separately one after the other in either order. Preferably, the basic polymer or copolymer of the different dispersing agents is the same in each case.

In a fifth example, a partially neutralised polycarboxylate may be added after the completion of grinding. Partially neutralised polycarboxylates for use as dispersing agents for pigments are known per se, eg. from JP55-40715. The use of such an agent in grinding mineral materials such as $CaCO_3$ in an aqueous medium is also described in U.S. Pat. No. 4,840,985. However, the process described in that specification is applied in a single stage and under the specific conditions that the particulate mineral material treated is coarse, the partially neutralised agent is added to the grinding medium before or during grinding to assist grinding and the degree of neutralisation of the agent as added is in the range 40 to 96%. In contrast, if in carrying out the method of the present invention it is desired to use the fifth example wherein a partially neutralised polycarboxylate dispersing agent is added, the dispersant is added to the finely ground material after the completion of grinding. We would also contemplate that the degree of neutralisation of the agent as added is 30% or less. In this example the dispersing agent added prior to and during grinding may suitably comprise a fully neutralised polycarboxylate. Preferably, the partially and fully neutralised polycarboxylates used in the different addition stages comprise the same basic polymer or copolymer, eg. a sodium polyacrylate.

The pH may also be maintained in the range 8.5 to 9.8 in one or more of the grinding stages in a multi-stage grinding process, especially the last grinding stage in accordance with our invention the subject of a copending International application of even date. In all stages where the pH is to be adjusted to be within a required range, the pH may be measured by a pH monitor and the amount of dispersing agent and/or the amount of neutralising agent (if such an additional agent is employed) may be adjusted until the required pH is reached. This adjustment may be carried out automatically using a mechanised addition device working under closed loop control using the measured pH value.

In each of the first to fifth examples of controlling the pH in the required range in the process according to the present invention, the dispersing agent and other additive(s) (if any), eg. alkali in the second example, are desirably added whilst the aqueous suspension is being stirred or agitated. This will ensure that the required pH in the aqueous suspension is achieved rapidly, almost instantaneously.

The total quantity of dispersing agents used in the method of the invention should be sufficient to provide a fully deflocculated final suspension. In practice, this normally means that the total amount of the dispersing agent is at least 0.1% by weight, based on the weight of dry particulate inorganic material, and generally does not exceed 1.5% by weight, based on the weight of dry particulate inorganic material. More preferably, the quantity of the dispersing agent used in the method of the invention is at least 0.05% by weight, based upon the weight of dry particulate inorganic material. Normally, the amount of dispersing agent will not exceed 1.0% by weight at each addition site, the actual amount depending on the particular dispersing agent used, based upon the weight of dry particulate inorganic material. Another basis on which to quantify the amount of dispersing agent to be used is the number of moles of carboxyl per tonne of dry pigment. Thus, it is normally found that the amount of the dispersing agent added before and during grinding is preferably that represented by from 10 to 100 moles of carboxylate per tonne of dry pigment, and the amount of the dispersing agent added in step (c) is preferably from 10 to 100 moles of carboxylate per tonne of dry pigment. By way of example, the monomer molecular weight of completely neutralised sodium polyacrylate ($CH_2.CH.COONa$) is 94 g, and the monomer molecular weight of poly(acrylic acid) ($CH_2.CH.COOH$) is 72 g. Each of these polymeric dispersing agents has 1 mole of carboxylate per monomer unit. In the case of the poly(acrylic acid) 10 moles of carboxylate per tonne of dry pigment is provided by an amount of 0.079% by weight, based on the weight of dry pigment.

The suspension of the ground inorganic material may be dewatered by one of the methods familiar to those skilled in the art, for example by thermal evaporation, by filtration or by means of a centrifuge. When a dispersing agent is added according to step (c) before dewatering is performed, the dewatering is preferably effected by a process of membrane filtration. The suspension is preferably dewatered to a concentration of at least 75% by weight of dry pigment.

For a better understanding of the present invention, and to show how it may be put into effect, reference will now be made to the accompanying drawing which is diagrammatic flow chart of a process embodying the invention.

A suspension of an alkaline earth metal pigment which has been subjected to preliminary comminution is introduced through a conduit 1 to a first wet attrition grinding mill 3. A solution of a substantially completely neutralised polyacrylate dispersing agent is also introduced through a conduit 2. The attrition grinding mill is provided with an impeller 4 which is rotated on a vertical shaft 5 by suitable driving means (not shown). Before the commencement of grinding the mill is charged with a particulate grinding medium 6 consisting of grains of diameters in the range of from 0.5 to 1.0 mm. After the alkaline earth metal pigment has been ground for a time sufficient to reduce the percentage by weight of particles having an equivalent spherical diameter smaller than 2 μm to a suitable intermediate value, the suspension of alkaline earth metal pigment is withdrawn through a sieve 7 of nominal aperture 0.25 mm, which retains the grinding medium, an outlet 8 and a conduit 9 to a second attrition grinding mill 11, which is substantially identical to the first mill. A further quantity of a solution of the substantially completely neutralised polycarboxylate dispersing agent may be added to the second attrition grinding mill through a conduit 10. After the alkaline earth metal pigment has been ground to the required final degree of fineness, the suspension of the pigment is withdrawn through an outlet 12 where the grinding material is retained on a sieve and a conduit 13 to a mixing tank 14. A quantity of a polycarboxylate dispersing agent is introduced through a conduit 15. The pH is adjusted to approximately pH 9 in one of the ways described above. Additive material if required to achieve this, e.g. NaOH, may also be added via the conduit 15. After mixing for a time sufficient to distribute the partially neutralised polycarboxylate dispersing agent uniformly throughout the suspension of the pigment, a fluid and rheologically stable suspension of the pigment is withdrawn through an outlet 16.

In an alternative embodiment (not shown), further grinding stages, preferably at least three grinding stages in total, are employed each under conditions similar to those in the mill 11.

The invention will now be illustrated further by reference to the following example.

EXAMPLE

A sample of a natural ground marble flour having a particle size distribution such that substantially all of the particles were smaller than 53 μm was mixed with water containing 0.2% by weight, based on the weight of dry marble, of a completely neutralised sodium polyacrylate dispersing agent having a weight average molecular weight of 6500. The suspension thus formed contained 65% by weight of dry marble. The suspension was subjected to attrition grinding using as the grinding medium silica sand having substantially spherical particles of diameter in the range from 0.5 mm to 1.0 mm. Grinding was continued until the particle size distribution of the marble was such that 40% by weight consisted of particles having an equivalent spherical diameter smaller than 2 μm.

A further amount of 0.1% by weight, based on the weight of dry marble, of the same dispersing agent was then added and the suspension of ground marble was subjected to a second stage of attrition grinding using the same grade of silica sand as before. The grinding was continued until the particle size of the ground marble was such that 90% by weight consisted of particles having an equivalent spherical diameter smaller than 2 μm.

The suspension of the finely ground marble was then divided into two portions A and B. To Portion A there was added 0.25% by weight, based on the weight of dry marble, of the same dispersing agent as had been used in the earlier stages, and to Portion B there was added a polyacrylic acid having a weight average molecular weight of 6500 (as measured in the fully neutralised form), with no additional additive and to Portion B there was added a polyacrylate dispersing agent having a weight average molecular weight of 6500 with adjustment of the pH of the suspension to approximately pH 9, e.g. pH 8.8 to 9.2. The amount added was the such that the number of moles of carboxyl groups added per unit weight of dry pigment was the same as for Portion A. Each portion was then dewatered by membrane filtration to a solids concentration of 76% by weight of dry marble, and the viscosity of each suspension was measured immediately after dewatering by means of a Brookfield Viscometer fitted with Spindle No. 3 at a speed of 100 rpm. Further measurements of the viscosity of the suspension were made after the suspension had been standing for 1 hour and for 24 hours, respectively.

As a comparison, a further suspension was prepared containing 76% by weight of dry marble which had been ground by the grinding medium to a particle size distribution such that 90% by weight consisted of particles having an equivalent spherical diameter smaller than 2 μm. However, in this case, the total amount of 0.55% by weight, based on the weight of dry marble, of the completely neutralised dispersing agent which was used for Portion A was added at the commencement of the grinding operation.

The results are set forth in the following Table.

TABLE 1

| | Viscosity (mPa · s) after time of | | |
| --- | --- | --- | --- |
| | 0 hour | 1 hour | 24 hours |
| Portion A | 185 | 330 | 640 |
| Portion B | 150 | 210 | 350 |
| Comparison | 220 | 600 | 1360 |

These results show that a suspension containing 76% by weight of marble ground to a particle size distribution such that 90% by weight consists of particles having an equivalent spherical diameter smaller than 2 μm has a lower initial viscosity, and a lesser tendency to gel, or increase in viscosity on standing, when it is treated after grinding with a polycarboxylate dispersing agent with the pH adjusted to pH 8.8 to 9.2 than when it is treated with an equivalent dose of a completely neutralised polycarboxylate dispersing agent with no step to control pH. Also both suspensions treated after grinding with an additional dose of a dispersing agent showed superior rheological properties to an equivalent ground marble suspension which had been prepared by adding the same total amount of dispersing agent in a single dose at the commencement of grinding.

What is claimed is:

1. A process for preparing a concentrated aqueous suspension of a finely ground particulate material, which process comprises:

(a) preparing an aqueous suspension comprising at least 20% by weight of the particulate material comprising calcium carbonate in coarse particulate form;

(b) grinding the suspension formed in step (a) in the presence of a polycarboxylate dispersing agent for the particulate material in a grinding process in which the pH of the suspension in at least part of the grinding process is about 10 or higher to produce an aqueous suspension of a finely ground product of the particulate material wherein at least 90% by weight of the particles of the particulate material have an equivalent spherical diameter of less than 2 μm and at least 60% by weight of the particles of the particulate material have an equivalent spherical diameter of less than 1 μm;

(c) adding to the aqueous suspension of the finely ground product of the particulate material formed in step (b) an additive comprising an anionic polycarboxylate dispersing agent which adjusts the pH of the aqueous suspension whereby the aqueous suspension formed in step (c) has a pH which lies within the inclusive range 8.5 to 9.8; and wherein following addition of the said additive comprising the polycarboxylate dispersing agent in step (c), the suspension is not ground further.

2. A process according to claim 1 wherein the aqueous suspension of the product of the particulate material of step (c) is dewatered to a concentration of at least 65% by weight of the dry material.

3. A process according to claim 1 wherein said grinding process of step (b) comprises a single grinding stage.

4. A process according to claim 1 wherein said grinding process of step (b) is a multi-stage grinding process in which an aqueous suspension of the particulate material is passed to and treated by grinding in each of a series of grinding stages.

5. A process according to claim 4 wherein each grinding stage of the multi-stage grinding process has an associated dispersing agent addition site or stage which precedes its associated grinding stage.

6. A process according to claim 4 wherein each grinding stage of the multi-stage grinding process has an associated dispersing agent addition site or stage which is included within its associated grinding stage.

7. A method according to claim 4 wherein of said multi-stage grinding process there are at least three grinding stages optionally preceded by a preliminary comminution step, each of the said grinding stages having an associated dispersing agent addition site or stage.

8. A method according to claim 7 wherein there are at least three medium attrition grinding stages preceded by a preliminary comminution step.

9. A method according to claim 1 wherein a separation step follows the or each grinding stage of step (b) whereby a fine fraction of the particulate material present in the aqueous suspension delivered from the grinding stage is separated.

10. A method according to claim 9 wherein the separation step following the last grinding stage in the case of multi-stage grinding, or following the sole grinding stage in the case of single stage grinding, comprises froth flotation.

11. A method according to claim 1 wherein the dispersing agents employed at different stages in the process are the same or different and each comprises a water soluble polymer or copolymer derived from one or more monomers selected from the group consisting of acrylic acid, methacrylic acid, maleic acid and fumaric acid optionally, in the case of a copolymer, together with styrene or vinyl acetate.

12. A method according to claim 1 wherein the pH of the suspension in step (c) lies within the inclusive range 8.5 to 9.5.

13. A method according to claim 12 wherein the dispersing agent used in step (b) comprises a fully neutralised salt of a polycarboxylate.

14. A method according to claim 12 wherein the dispersing agent used in step (b) and added in step (c) comprises a polycarboxylate having the same polymer structure.

15. A method according to claim 12 wherein the dispersing agent added in step (c) comprises a water soluble acid and addition of the agent is followed by addition of an alkali.

16. A method according to claim 12 wherein the dispersing agent added in step (c) comprises a salt of a water soluble acid and the suspension is diluted with water and subsequently reconcentrated.

17. A method according to claim 12 wherein the dispersing agent added in step (c) comprises (a) a fully neutralised salt and (b) a water soluble acid which are added one after the other in either order.

18. A method according to claim 12 wherein the dispersing agent added in step (c) comprises a partially neutralised water soluble polycarboxylate in which not more than 30% of the acid groups are neutralised, and that dispersing agent is added prior to the associated grinding stage.

19. A method as claimed in claim 12 wherein the dispersing agents used in steps (b) and (c) each comprises a polyacrylate.

* * * * *